July 28, 1942. H. A. CLARK 2,291,570
OIL SEAL
Filed Dec. 27, 1940
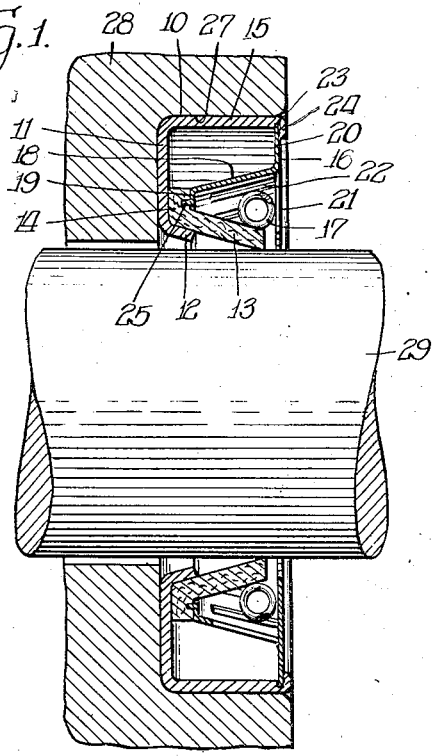
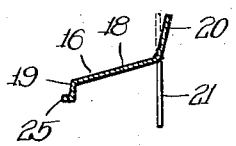
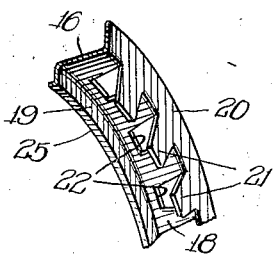
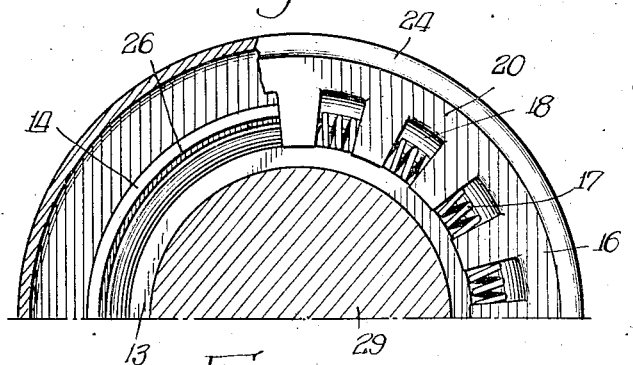
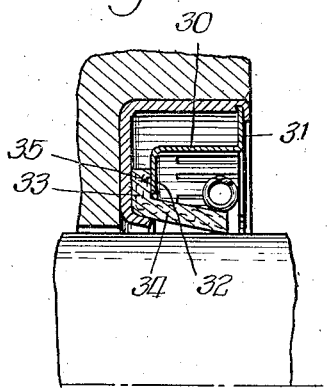
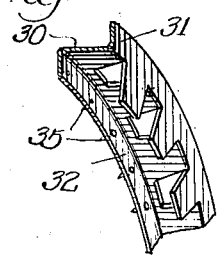
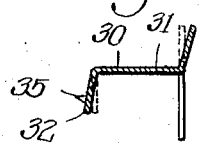
INVENTOR.
Harold A. Clark,
BY Cromwell, Greist & Warden
Attys Patented July 28, 1942

2,291,570

UNITED STATES PATENT OFFICE 2,291,570

OIL SEAL

Harold A. Clark, Miami Beach, Fla.

Application December 27, 1940, Serial No. 371,883

3 Claims. (Cl. 288—3)

The present invention relates to oil seals of the type designed for insertion as a self-contained unit in a bore in a housing about a shaft passing through the bore.

The primary object of the invention is to provide an improved seal of the type described which is characacterized by a one-piece closure member of novel construction which serves the twofold purpose of clamping the packing ring in the casing and retaining the constricting spring in proper position with respect to the sealing lip of the packing ring.

Another important object of the invention is to provide an improved seal of the character described which is inexpensive to manufacture, and which will function effectively to prevent leakage of oil from the housing along the shaft.

Other more specific objects and advantages will be evident upon a full understanding of the construction, arrangement and cooperation of the parts constituting the improved seal.

Two embodiments of the invention are presented herein by way of exemplification, but it will of course be appreciated that the invention is capable of being incorporated in other structurally modified forms coming equally within the scope of the appended claims.

In the accompanying drawing:

Fig. 1 is a diametric section through a seal constructed in accordance with the invention, showing the seal inserted in a bore in a housing about a shaft passing through the bore;

Fig. 2 is a partially broken away face view of one-half of the seal;

Fig. 3 is a radial section through the closure member which forms a part of the seal;

Fig. 4 is a fragmentary perspective view of the closure member;

Fig. 5 shows, in a view similar to Fig. 1, a modification of the invention;

Fig. 6 is a radial section through the closure member of the seal shown in Fig. 5; and Fig. 7 is a fragmentary perspective view of the same closure member.

The seal illustrated in Figs. 1 to 4 inclusive will first be described. This seal includes a centrally apertured sheet metal cup 10. The bottom 11 of the cup is provided, about the edge of the aperture therein, with a narrow reentrant flange 12 of generally conical form. The cup contains a packing ring 13 of leather, synthetic rubber, or other suitable packing material. The packing ring 13 is of generally conical form, and is provided, at its large diameter end, with a narrow outwardly extending flange 14, which flange is of considerably smaller diameter, however, than the rim 15 of the cup. The packing ring 13 is positioned in the cup with the large diameter end of the same sleeved snugly over the flange 12 of the cup and with the flange 14 clamped tightly against the bottom 11 of the cup some distance inwardly from the rim 15 of the latter.

The seal is characterized by a sheet metal closure member 16 which serves the twofold purpose of clamping the flange 14 of the packing ring against the bottom 11 of the cup and retaining an endless coil spring 17 in a position encircling the small diameter end of the packing ring. The closure member 16 is a ring and is provided with a conical intermediate section 18; a narrow inwardly extending flange 19 at the small diameter end of the intermediate section; an outwardly extending flange 20 at the large diameter end of the intermediate section; and a plurality of inwardly extending tongues 21, also at the large diameter end of the intermediate section, which tongues are cut from the metal of the intermediate section, leaving openings 22 in the latter, and are bent inwardly into substantially the plane of the outwardly extending flange 20. This closure ring 16 is preferably made of thin spring metal, in order to enable the same to be compressed resiliently to a certain extent in a direction axially of the assembly.

The closure ring 16 is positioned in the cup 10 outwardly of the packing ring 13, and is compressed axially, under substantial pressure applied at the time of assembly, with the inwardly extending flange 19 (hereinafter referred to as the pressure foot) on the closure ring engaging the flange 14 (hereinafter referred to as the stub flange) on the packing ring and with the outwardly extending flange 20 on the closure ring fitting closely within the rim 15 of the cup, preferably in a shallow counterbore 23 provided in the latter. The closure ring 16 is held under pressure in this position by an inwardly turned bead 24 on the edge of the rim 15.

The pressure foot 19 of the closure ring 16 is maintained in centered and radially interlocked association with the stub flange 14 on the packing ring 13 by a small axially turned flange 25 on the inner edge of the pressure foot 19, which flange is embedded within a groove 26 in the opposed face of the stub flange 14.

The flanges 19 and 20 on the closure ring 16 are preferably disposed in planes at right angles to the axis of the seal, as shown in Fig. 1, but before assembly of the parts under pressure these flanges are preferably inclined away from each other, as shown in Fig. 3, whereby to store up a certain amount of resiliency in the closure ring at the time that the latter is placed under axial pressure in the assembly.

As illustrated in Fig. 1, the seal is adapted to be press-fitted as a self-contained unit into a bore 27 in a housing 28, with the small diameter end of the packing ring 13 in relatively rotatable fluid-tight engagement with the periphery of a shaft 29 passing through the bore.

The modification shown in Figs. 5, 6 and 7 differs from the above described embodiment to the extent that the intermediate section 30 of the closure ring 31 is cylindrical, as distinguished from conical. In this modification the pressure foot 32 of the closure ring extends outwardly beyond the outer edge of the stub flange 33 of the packing ring 34 before joining the cylindrical intermediate portion 30, and the pressure foot 32 is interlocked with the stub flange 33, both radially and circumferentially, by small spurs 35 which project axially from the pressure foot and are embedded within the opposing face of the stub flange.

While the sealing device of the present invention is referred to as an "oil" seal, it will of course be understood that the same is not limited in its use to oil and that the word "oil" is intended to include within its meaning any and all fluids capable of being sealed with the device.

I claim:

1. In an oil seal of the self-contained unit type, a centrally apertured sheet metal cup, a flexible packing ring of generally conical form which is provided at its large diameter end with a narrow outwardly extending flange, which flange is of considerably smaller diameter than the rim of the cup, said packing ring being positioned in the cup with the flange of the packing ring clamped against the bottom of the cup about the aperture in the latter, an endless coil spring encircling the small diameter end of the packing ring, and a closure ring characterized by an axially extending intermediate section, an inwardly extending pressure foot at one end of the intermediate section, and a plurality of inwardly extending tongues at the other end of the intermediate section, which tongues are cut from the intermediate section and bent inwardly, said closure ring being positioned in the cup outwardly of the packing ring with the foot on the closure ring engaging the flange on the packing ring, with the inwardly extending tongues engaging one side of the spring, and with the adjacent end of the closure ring secured under axial pressure within the rim of the cup.

2. In an oil seal of the self-contained unit type, a centrally apertured sheet metal cup, a flexible packing ring of generally conical form which is provided at its large diameter end with a narrow outwardly extending flange, which flange is of considerably smaller diameter than the rim of the cup, said packing ring being positioned in the cup with the flange of the packing ring clamped against the bottom of the cup about the aperture in the latter, an endless coil spring encircling the small diameter end of the packing ring, and a closure ring characterized by an axially extending intermediate section, an inwardly extending pressure foot at one end of the intermediate section, an outwardly extending flange at the other end of the intermediate section, and a plurality of inwardly extending tongues at the last mentioned end of the intermediate section, which tongues are cut from the intermediate section and bent inwardly, said closure ring being positioned in the cup outwardly of the packing ring with the foot on the closure ring engaging the flange on the packing ring, with the inwardly extending tongues engaging one side of the spring, and with the outwardly extending flange on the closure ring secured under axial pressure within the rim of the cup.

3. In an oil seal of the self-contained unit type, a centrally apertured sheet metal cup, a flexible packing ring of generally conical form which is provided at its large diameter end with a narrow outwardly extending flange, which flange is of considerably smaller diameter than the rim of the cup, said packing ring being positioned in the cup with the flange of the packing ring clamped against the bottom of the cup about the aperture in the latter, an endless coil spring encircling the small diameter end of the packing ring, and a spring metal closure ring characterized by a conical intermediate section, an inwardly extending pressure foot at the small diameter end of the intermediate section, an outwardly extending flange at the large diameter end of the intermediate section, and a plurality of inwardly extending tongues at the large diameter end of the intermediate section, which tongues are cut from the intermediate section and bent inwardly, said closure ring being positioned in the cup outwardly of the packing ring and being compressed axially with the foot on the closure ring engaging the flange on the packing ring in radially interlocked association with the latter, with the inwardly extending tongues engaging one side of the spring, and with the outwardly extending flange on the closure ring secured under axial pressure within the rim of the cup in engagement with the rim.

HAROLD A. CLARK.